US007113312B2

United States Patent
Kodimer

(10) Patent No.: US 7,113,312 B2
(45) Date of Patent: Sep. 26, 2006

(54) METHOD AND APPARATUS FOR AUTO-MATCH SIMPLEX/DUPLEX PHOTOCOPYING

(75) Inventor: Marianne L. Kodimer, Huntington Beach, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 890 days.

(21) Appl. No.: 10/109,452

(22) Filed: Mar. 27, 2002

(65) Prior Publication Data

US 2003/0184816 A1    Oct. 2, 2003

(51) Int. Cl.
*H04N 1/04* (2006.01)

(52) U.S. Cl. .................. 358/474; 358/1.9; 358/452; 399/45; 399/110; 382/254; 382/275

(58) Field of Classification Search ............... 358/474, 358/501, 505, 1.9, 452; 382/254, 275; 399/45, 399/110
See application file for complete search history.

(56) References Cited

U.S. PATENT DOCUMENTS 6,029,020 A * 2/2000 Blackman et al. ............ 399/45
6,101,283 A * 8/2000 Knox ......................... 382/254
6,348,980 B1 * 2/2002 Cullen et al. ................ 358/1.9
6,546,228 B1 * 4/2003 Motohashi et al. ......... 399/401

* cited by examiner

*Primary Examiner*—Douglas Q. Tran
*Assistant Examiner*—Negussie Worku
(74) *Attorney, Agent, or Firm*—Tucker, Ellis & West LLP

(57) ABSTRACT

A method and apparatus for photocopying is disclosed including implementations for scanning a topside of a source page and determining whether the topside of the source page contains a topside image. In the event that the topside of the source page is determined to contain the topside image, implementations are provided for storing the topside image as topside document page data. Afterwards, the invention includes steps and structures for flipping the page and scanning the backside of the source page, and determining whether the backside of the source page contains a backside image. In the event that the backside of the source page is determined to contain the backside image, implementations are provided for storing the backside image as backside document page data. The invention provides for printing a target page with the respective stored topside and backside document page data, so as to produce a respective copy of the source page.

28 Claims, 4 Drawing Sheets

Flow for Keeping Job Information

METHOD AND APPARATUS FOR AUTO-MATCH SIMPLEX/DUPLEX PHOTOCOPYING

BACKGROUND OF THE INVENTION

The present invention is directed to the field of photocopying, particularly to methods and apparatuses configured to perform simplex and duplex photocopying operations. A typical photocopying apparatus provides basic copier settings for selecting between simplex and duplex copy options, i.e. making either one-sided or two-sided copies of a set of document pages to be printed. In a typical implementation, the setting of these options requires the user to define the layout of both the source document and the target output. These layout combinations are shown in FIG. 2, which depicts a graphical selection menu such as is found on a typical photocopier implementation, indicating the optional layout combinations. Here the user must identify the type of source document as well as the desired target output, as optionally selected from among the following page layout options:

Simplex to simplex (1=>1): the source document and the desired target output are both simplex;

Duplex to duplex (2=>2): the source document and the desired target output are both duplex;

Simplex to duplex (1=>2): the source document is simplex and the desired target output is duplex; and Duplex to simplex (2=>1): the source document is duplex and the desired target output is simplex.

FIG. 1 shows default settings of a typical copier. The second button shows the Simplex default layout. Specifically, the default setting is "Simplex to Simplex". This setting indicates that the source document is simplex and the target output will be simplex. To change the setting, the user presses simplex button to get options shown above with respect to FIG. 2.

The problem with this user interface design is its complexity. With this design, the user must assess the options as they relate to both the source document and the target output. This can create a complication in frequent instances when the user has a "mixed" stack of document pages, i.e. where some pages in a stack are simplex and others are duplex. In such instances, the user must separate the simplex and duplex documents, run respective copies, and collate both the originals and copies. This results in extra time and effort for the user, thereby reducing efficiency. On the other hand, the user may simply run the entire stack through the copier in a duplex-only mode. However, copying operations must be performed that are unneeded for the simplex source pages. This results in inefficiency due to extra copying time, and extra copying expense in scenarios where per-page copy charges are incurred by the user. Consequently, the typical photocopier does not offer the user an interface with default settings that represent the user's most frequent goal of making a copy that matches the source document.

SUMMARY OF THE INVENTION

A method and apparatus for photocopying is disclosed including implementations for scanning a topside of a source page and determining whether the topside of the source page contains a topside image. In the event that the topside of the source page is determined to contain the topside image, implementations are provided for storing the topside image as topside document page data. Afterwards, the invention includes steps and structures for flipping the page and scanning the backside of the source page, and determining whether the backside of the source page contains a backside image. In the event that the backside of the source page is determined to contain the backside image, implementations are provided for storing the backside image as backside document page data. The invention provides for printing a target page with the respective stored topside and backside document page data, so as to produce a respective copy of the source page.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

With the present invention, the user is not required to specify the source document layout (either simplex or duplex). The layout specifications of the source documents are determined automatically by the copier's scan capability. The invention enables the user to specify the desired target layout only (either simplex or duplex). With the present invention, the user identifies a target layout only when it is different from the source layout. Much of the time, the user simply wants to make a literal copy of the source document. That is, if the source is simplex, the user wants the output to be simplex and if the source is duplex, the desired output is to be duplex.

The present invention includes a simple and predictable user interface that would, by default, match the simplex/duplex option of the source. The default simplex/duplex copier setting of the present invention creates an output that matches the source (regardless of whether the source is simplex or duplex). Thus, the user only has to make a decision to change a copier option when the target printout is desired to be different than the source document.

Figure 1:
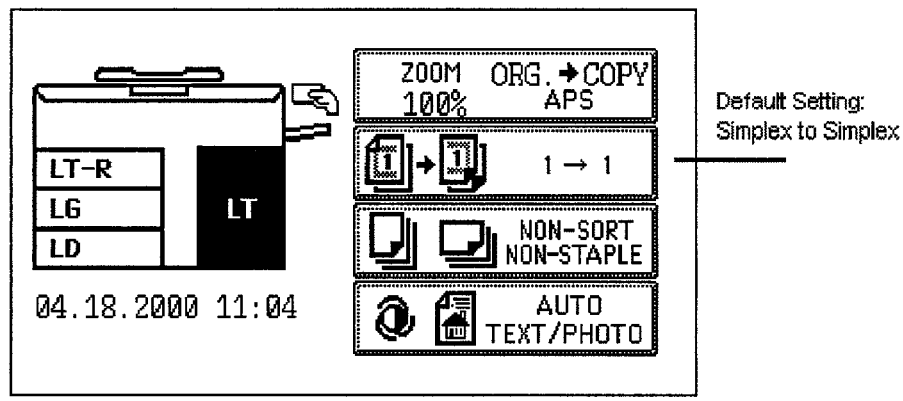
FIGS. 1 and 2 illustrate a typical photocopier format selection menu.
Figure 2:
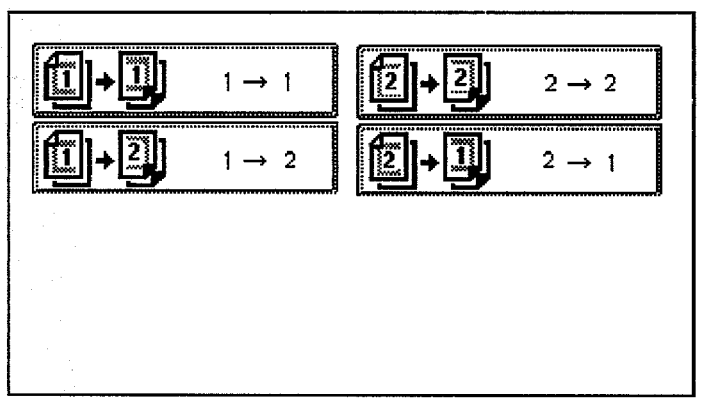
Figure 3:
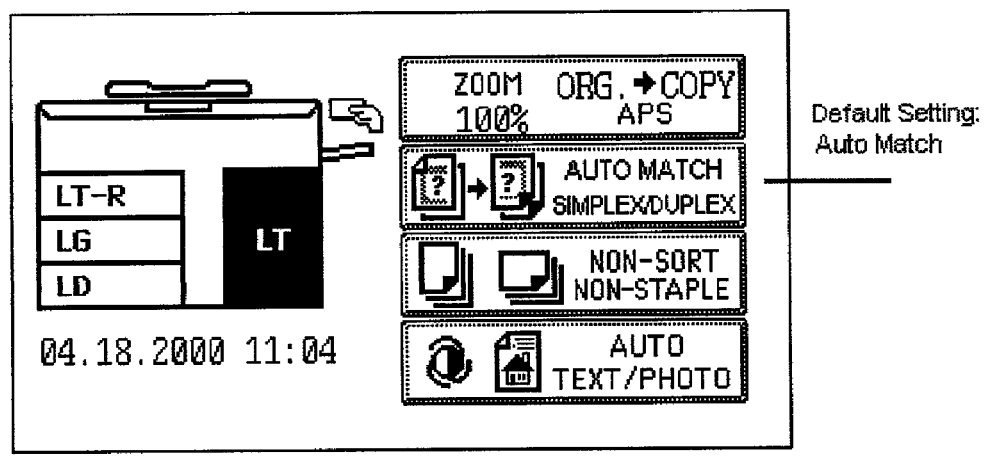
FIGS. 3 and 4 show a photocopier format selection menu in accordance with the present invention.
Figure 4:
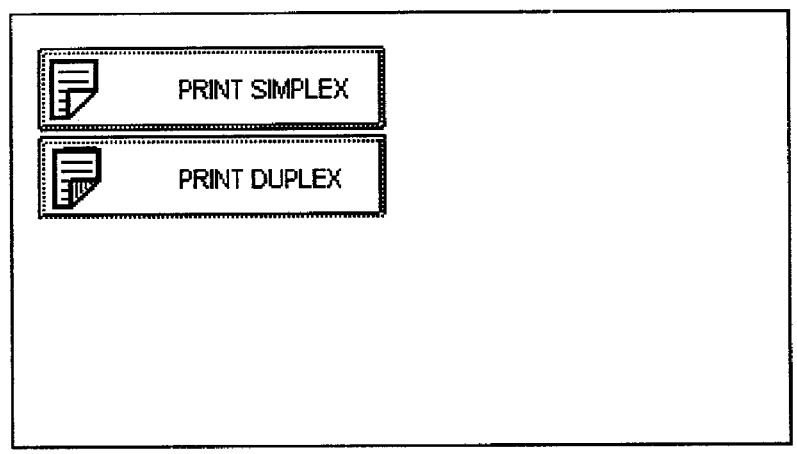

A preferred embodiment of the present invention is shown in FIG. 3. The second button is a "layout" button indicating an "Auto Match Simplex/Duplex" default layout. This setting indicates that the target output will match that of the source document. If the source document is simplex, the target output will be simplex. If the source document is duplex, the target document is duplex. The user needs to change the default setting only if the desired output is different than the source. To change the setting, the user presses layout button to manually select the target Simplex/Duplex layout options to shown in FIG. 4. Here the user must identify the desired target output only. Options include "Print Simplex" and "Print Duplex". Because the user does not have to consider the source document and how it relates to the target document, the decision making process is easier and the User Interface is more intuitive and usable.

The photocopier of present invention includes a scanning mechanism and an on-board memory for saving the scanned document page data. The memory also maintains a table for keeping track of scanned document page data, and for determining whether the page includes document page data. In the present method of implementing the auto-match simplex/duplex option, each page of the document is passed from the feeder across the scan mechanism. The following job information is maintained in the table: source document page count; whether the top side of the page contains an image; and whether the back of the page contains an image.

Figure 5:
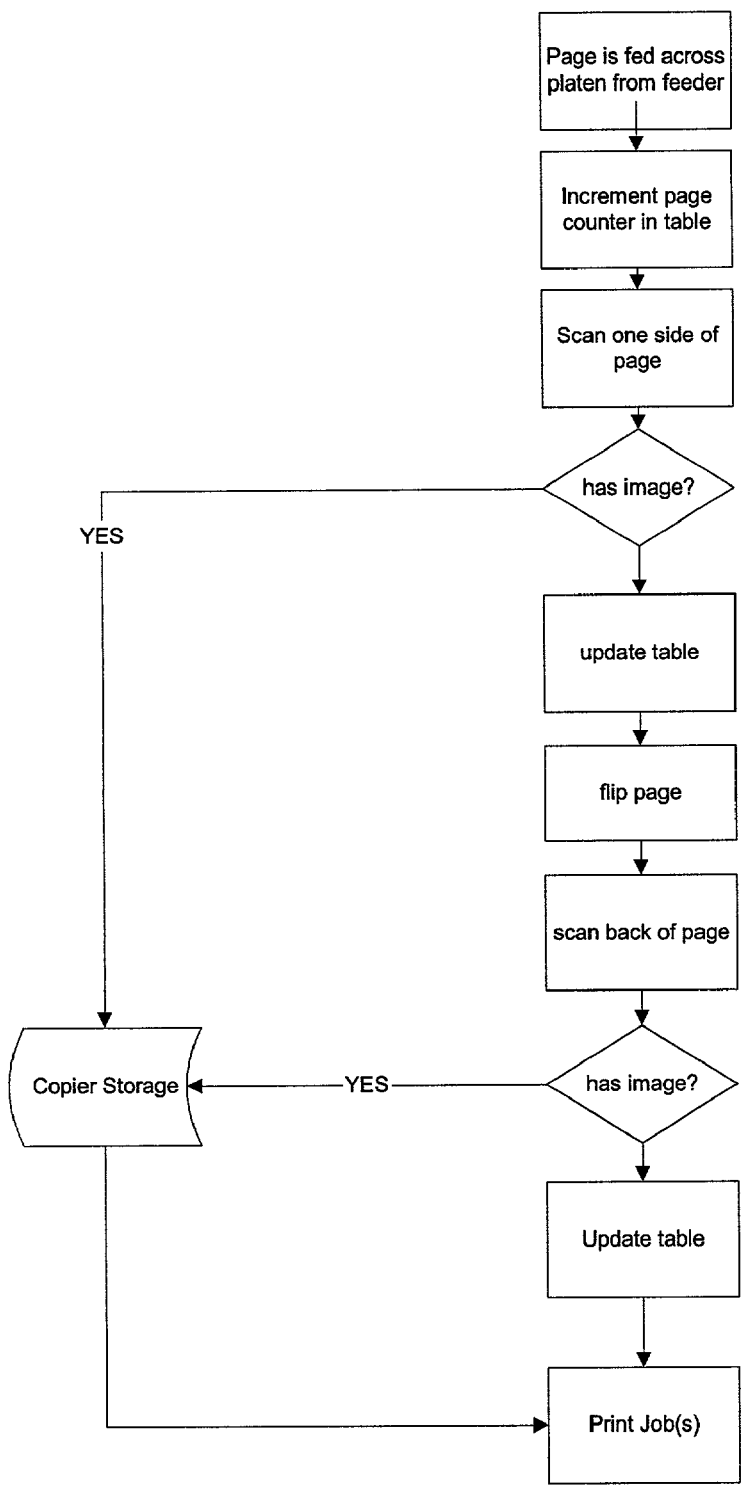
FIG. 5 is a flow chart depicting the scanning input operational steps in accordance with the photocopying method of the present invention.

The steps of the present method are outlined in FIG. 5, showing how document information is recorded and updated. The page is sent from the automatic document feeder across the copier platen to be scanned. The page is counted and the table is updated to increment the page count. The topside of the page is scanned. A determination is made as to whether the topside of the page contains an image. If so, the image is stored on the copier as document page data. Whether or not the topside of the page contains an image, the table is updated accordingly to indicate whether page data is stored for later output. Then the page is flipped and the backside of the page is scanned. A determination is made as to whether the backside of the page contains an image. If so, the image is stored on the copier as document page data. Whether or not the backside of the page contains an image, the table is updated accordingly to indicate whether page data is stored for later output. Upon scanning each page of the document copy job, the copier then prints the topside and backside of each page of the document according to the document page data indicated in the table. The copier prints in accordance with the number of copies requested from a menu selection at the copier front panel, prior to initiating the copy job.

Figure 6:
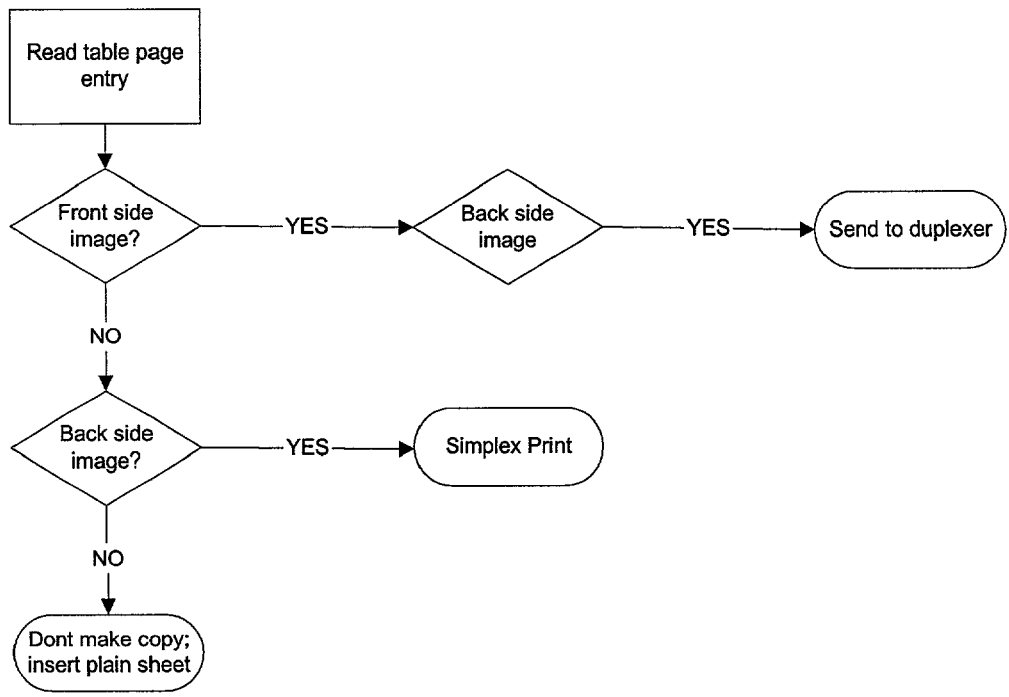
FIG. 6 is a flow chart depicting the printing output decision steps in accordance with the photocopying method of the present invention.

As shown in FIG. 6, the method enables several types of output options in a target document. If the topside of the source page only has an image, the target output is simplex and only the topside will be printed. If the backside only has an image, the target output simplex and only the backside will be printed. If both the topside and backsides have an image, the target output page is sent to the duplexer for duplex printing. However, if neither the topside nor the backside of the source page has an image, neither side is printed, a blank sheet of paper is inserted to the target output. In this manner, the present photocopying method will only allow copies to be made of the sides of document pages having an image, thereby increasing copier efficiency, and reducing the time and expense required to produce a copy job. By only printing one or both of the sides inserted into the copier, the present method avoids cost and inefficiency resulting from copier accidents, where documents are placed "upside down" or the like.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A method of photocopying comprising:
   scanning a topside of a source page;
   determining whether the topside of the source page contains a topside image;
   in the event that the topside of the source page is determined to contain the topside image, storing the topside image as topside document page data;
   flipping the page and scanning the backside of the source page;
   determining whether the backside of the source page contains a backside image;
   in the event that the backside of the source page is determined to contain the backside image, storing the backside image as backside document page data;
   printing a target page with the respective stored topside and backside document page data, so as to produce a respective copy of the source page.

2. The method of claim 1 wherein, after the steps of determining whether the topside and backside of the source page contains an image, performing respective steps of updating a table to indicate whether respective topside and backside document page data is stored.

3. The method of claim 2 wherein the step of printing comprises a step of only printing topside and backside document page data as indicated in the table.

4. The method of claim 2 wherein, prior to the step of scanning, performing a step of counting the source page as inserted into a copier and updating the table to increment a page count.

5. The method of claim 1 further comprising a step of repeating the printing step a predetermined number of times in accordance with a number of copies requested from a menu selection.

6. The method of claim 1 wherein, prior to the step of scanning, a step is performed of sending the source page from an automatic document feeder across a copier platen to be scanned.

7. The method of claim 1 wherein step of printing produces a target page having a document format selected from one of: simplex having a printed image on only the topside; simplex having a printed image on only the backside; and duplex having a printed image on both the topside and backside.

8. A photocopier comprising:
   a scanning mechanism for scanning a topside and a backside of a source page;
   a flipping mechanism for flipping the page to enable scanning the backside of the source page;
   a determining implementation for determining whether at least one of the topside and backside of the source page contains respective topside and backside images;
   a memory for storing the respective topside and backside images as respective topside and backside document page data;
   a printer arrangement for printing a target page with the respective stored topside and backside document page data, so as to produce a respective copy of the source page.

9. The photocopier of claim 8 further comprising a table, maintained in the memory, for indicating whether respective topside and backside document page data is stored.

10. The photocopier of claim 9 wherein the printer arrangement is configured to only print topside and backside document page data as indicated in the table.

11. The photocopier of claim 9 further comprising a counter for counting the source page upon insertion into a copier, and also comprising means for updating the table to increment a page count.

12. The photocopier of claim 8 wherein the printing arrangement is configured to repeat the printing step a predetermined number of times in accordance with a number of copies requested from a menu selection.

13. The photocopier of claim 8 further comprising a structure for sending the source page from an automatic document feeder across a copier platen to the scanning mechanism to be scanned.

14. The photocopier of claim 8 wherein the printer arrangement is configured to output a target page having a document format selected from one of: simplex having a printed image on only the topside; simplex having a printed image on only the backside; and duplex having a printed image on both the topside and backside.

15. An image reproduction system comprising:
   means adapted for prompting an associated user for page layout data representative of a selected page output format including one of simplex, duplex and unspecified;
   means adapted for receiving page layout responsive to a prompt of the associated user;
   means adapted for commencing a scanning operation of an associated document, which associated document includes a document format comprised of at least one of a one sided document and a two sided document;
   scanning means adapted for generating image data corresponding to a scan of the associated document;
   means adapted for testing image data to determine whether the associated document was one sided or two sided; and
   means adapted for commencing a rendering of an output document in accordance with the page layout data and the image data.

16. The image reproduction system of claim 15 wherein the page output format is in accordance with the page layout data specified independently of a format of the associated document.

17. The image reproduction system of claim 15 further comprising storage means adapted for storing page layout data.

18. The image reproduction system of claim 17 wherein the storage means further includes means adapted for storing image data.

19. The image reproduction system of claim 18 further comprising means adapted for updating image data stored in the storage means based on the testing of the image data.

20. The image reproduction system of claim 19 wherein the image data is updated based on whether the associated document is one sided or two sided.

21. The image reproduction system of claim 15 further comprising means adapted for selecting parameters for rendering of an output document.

22. A method for image reproduction comprising the steps of:
   prompting an associated user for page layout data representative of a selected page output format including one of simplex, duplex and unspecified;
   receiving page layout responsive to a prompt of the associated user;
   commencing a scanning operation of an associated document, which associated document includes a document format of at least one of a single sided document and a two sided document;
   generating image data corresponding to a scan of the associated document;
   testing image data to determine whether the associated document was one sided or two sided; and
   commencing a rendering of an output document in accordance with the page layout data and the image data.

23. The method for image reproduction of claim 22 wherein the page output format is in accordance with the page layout data specified independently of a format of the associated document.

24. The method for image reproduction of claim 22 further comprising the step of storing page layout data.

25. The method for image reproduction of claim 24 further comprising the step of storing image data.

26. The method for image reproduction of claim 25 further comprising the step of updating image data stored based on the testing of the image data.

27. The method for image reproduction of claim 26 wherein the image data is updated based on whether the associated document is one sided or two sided.

28. The method for image reproduction system of claim 22 further comprising the step of selecting parameters for rendering of an output document.

\* \* \* \* \*